US012076595B2

(12) United States Patent
Hung et al.

(10) Patent No.: US 12,076,595 B2
(45) Date of Patent: Sep. 3, 2024

(54) FALL ARRESTER

(71) Applicant: YOKE INDUSTRIAL CORP., Taichung (TW)

(72) Inventors: Wei-Chieh Hung, Taichung (TW); Wen-Ming Liao, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 868 days.

(21) Appl. No.: 17/101,210

(22) Filed: Nov. 23, 2020

(65) Prior Publication Data

US 2022/0161072 A1 May 26, 2022

(51) Int. Cl.
*A62B 35/00* (2006.01)
*F16D 59/00* (2006.01)

(52) U.S. Cl.
CPC ................................ *A62B 35/0093* (2013.01)

(58) Field of Classification Search
CPC ...................... A62B 35/0093; F16D 2127/002
See application file for complete search history.

(56) References Cited

U.S. PATENT DOCUMENTS

2010/0226748 A1 9/2010 Wolner
2013/0105247 A1* 5/2013 Casebolt .................. A62B 1/10 188/185
2018/0147425 A1* 5/2018 Su ...................... A62B 35/0093
2019/0002254 A1* 1/2019 Dennis .................... F16H 57/10
2019/0083828 A1* 3/2019 Sun .................... A62B 35/0093

FOREIGN PATENT DOCUMENTS

CN 105477797 A 4/2016
CN 208838919 U 5/2019
CN 214129975 U 9/2021
EP 3278840 A1 * 2/2018 ............... A62B 1/10

OTHER PUBLICATIONS

Search Report for CN202011130814.9, Issued Aug. 1, 2022, Total of 1 page.
Translation of Abstract of CN214129975, Total of 1 page.
Translation of Abstract of CN105477797, Total of 1 page.
Translation of Abstract of CN208838919, Total of 1 page.

* cited by examiner

*Primary Examiner* — Melody M Burch
(74) *Attorney, Agent, or Firm* — Apex Juris, pllc; R. Lynette Wylie

(57) ABSTRACT

A fall arrester includes holder, rotating drum, and braking module. The rotating drum is pivotally installed on the holder, and includes main body and pawl which has first abutting portion and is pivotally provided on setting part. The braking module is fixed to holder, and includes cover, friction plate, and ratchet plate, being coaxially set in order. The ratchet plate has second abutting portion on its periphery. When rotating drum rotates at speed greater than or equal to predetermined rotating speed, and first abutting portion moves to second position to abut against second abutting portion, the cover and ratchet plate rotate relative to friction plate, driven by rotating drum. Additionally, the cover and ratchet plate generate frictional resistance with friction plate respectively to stop the rotating drum. Thus, the braking module of the fall arrester can be replaced thereby enabling provision of a new braking module as an initial condition.

7 Claims, 7 Drawing Sheets

FALL ARRESTER

BACKGROUND OF THE INVENTION

1. Technical Field

The present invention relates generally to a fall arrester, and more particularly to a fall arrester whose braking module can be quickly replaced.

2. Description of Related Art

Nowadays, the floors of buildings are getting higher and higher. In addition, the risk of construction workers, or building exterior wall cleaners and painters working increases with the height of their working positions. Thus, when working in high-altitude places, the workers are often equipped with fall arresters with lifelines, wherein the fall arrester is fixed to a support, and the lifeline is fastened to the worker, which avoids the worker from keeping falling and ensures the safety of the worker.

A conventional fall arrester includes a rotating member, a lifeline, and a braking device, wherein an end of the lifeline is connected to and wound on the rotating member; the braking device includes a braking plate, a braking block, and a stopping member. The braking plate is connected to the rotating member, and is coaxially rotatable with the rotating member. The braking block is pivotally installed on the braking plate, and would be thrown out due to a centrifugal force generated by the instant rotation of the braking plate, and thus to engage with the stopping member for restricting the rotation of the rotating member. If the worker accidentally falls from a height, the braking device can play the role of emergency locking to stop the rotation of the rotating member, which avoids the worker from keeping falling.

However, the braking plate of the conventional fall arrester will wear out due to prolonged use. Thus, the braking plate needs to be adjusted regularly for braking parameters (such as the torque value of clamping screws). Additionally, the dismantling steps of the braking plate involve a variety of parts, which makes the dismantling steps cumbersome. If the fall arrester fails to be reassembled according to the standard steps, it may cause the fall arrester to lose effectiveness and cause potential harm to users.

From the above, a novel fall arrester is needed to solve the long-existing problems of the conventional fall arrester.

BRIEF SUMMARY OF THE INVENTION

In view of the above, the primary objective of the present invention is to provide a fall arrester, wherein the braking module of the fall arrester can be replaced by easy dismantling steps. Furthermore, each new braking module has the same value of braking parameters.

The present invention provides a fall arrester including a holder, a rotating drum, and a braking module. The holder includes a first arm and a second arm. The rotating drum is pivotally provided on the holder and located between the first arm and the second arm. The rotating drum includes a main body and at least one pawl, wherein the main body has an accommodating part and a setting part; the accommodating part is provided to be wound by a flexible long strip. The at least one pawl has a first abutting portion and is pivotally provided on the setting part. When the rotating drum rotates at a rotating speed which is equal to or greater than a predetermined rotating speed, the first abutting portion of the at least one pawl pivots from a first position to a second position. The braking module has a convex portion and is fixed to the first arm by the convex portion so that the braking module is located between the first arm and the setting part; the braking module further has a plurality of second abutting portions which are located on a rotation path of the first abutting portion in the second position, wherein the rotation path is formed by the rotation of the rotating drum; the second abutting portions can abut against the first abutting portion. The braking module includes a cover, a friction plate, and a ratchet plate, which are coaxially set in order. The ratchet plate has the plurality of second abutting portions on a periphery thereof, and further has an accommodation space for holding the friction plate and the cover, wherein the cover and the ratchet plate are fixedly connected to each other and clamp the friction plate therebetween; the friction plate has the convex portion which makes the friction plate be fixed to the first arm; when the rotating drum rotates at a rotating speed greater than or equal to the predetermined rotating speed, which makes the first abutting portion move to the second position and abut against the second abutting portions, the cover and the ratchet plate rotate relative to the friction plate, which is driven by the rotating drum. Moreover, the cover and the ratchet plate generate frictional resistance with the friction plate respectively so as to stop the rotation of the rotating drum.

The effect of the present invention is that, the braking module of the fall arrester can be replaced with a new one by easy dismantling steps. Furthermore, each new braking module has the same value of braking parameters.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
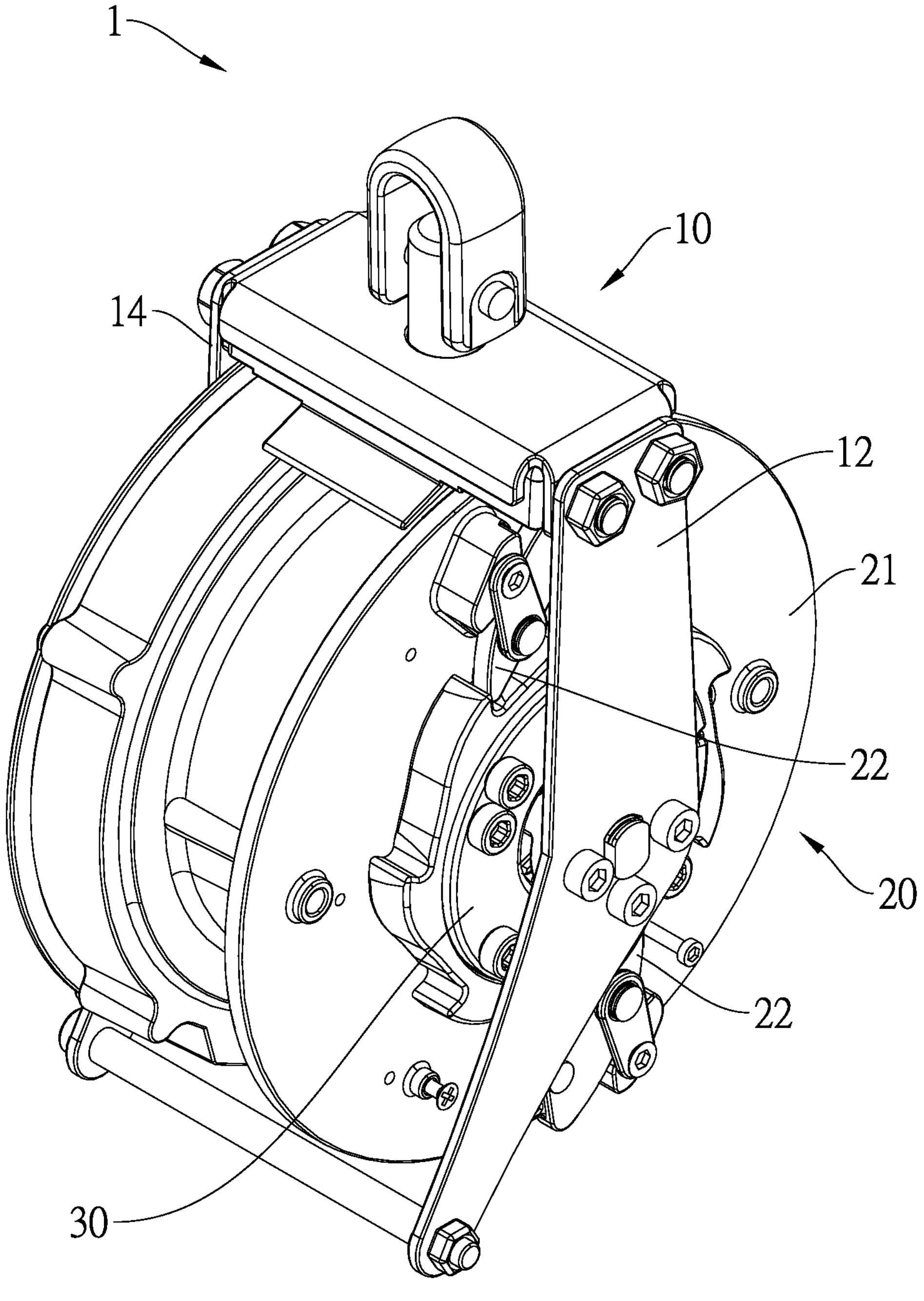
FIG. 1 is a perspective view of the fall arrester of the first embodiment of the present invention.
Figure 2:
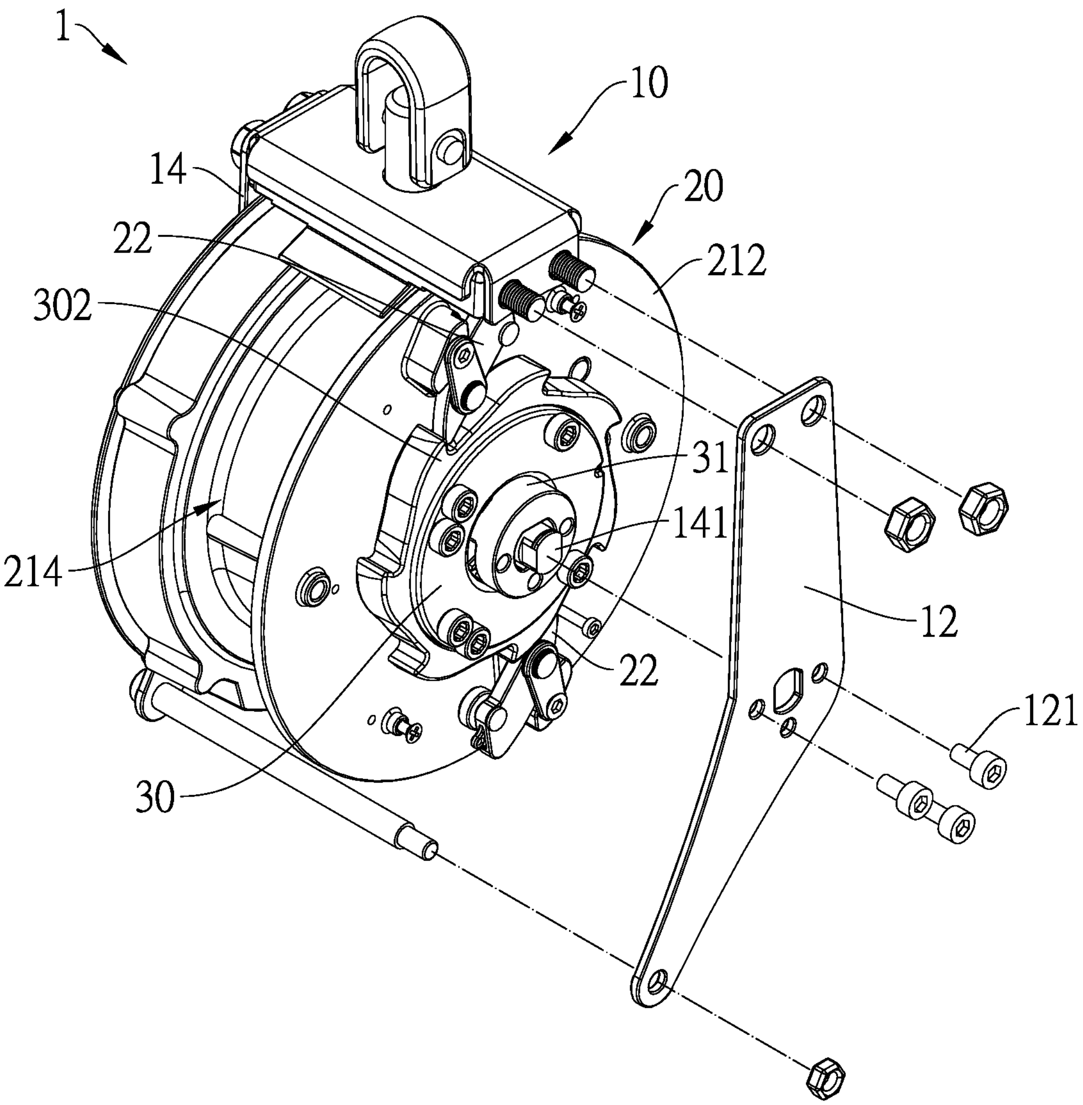
FIG. 2 is a partial exploded view of the fall arrester in FIG. 1.
Figure 3:
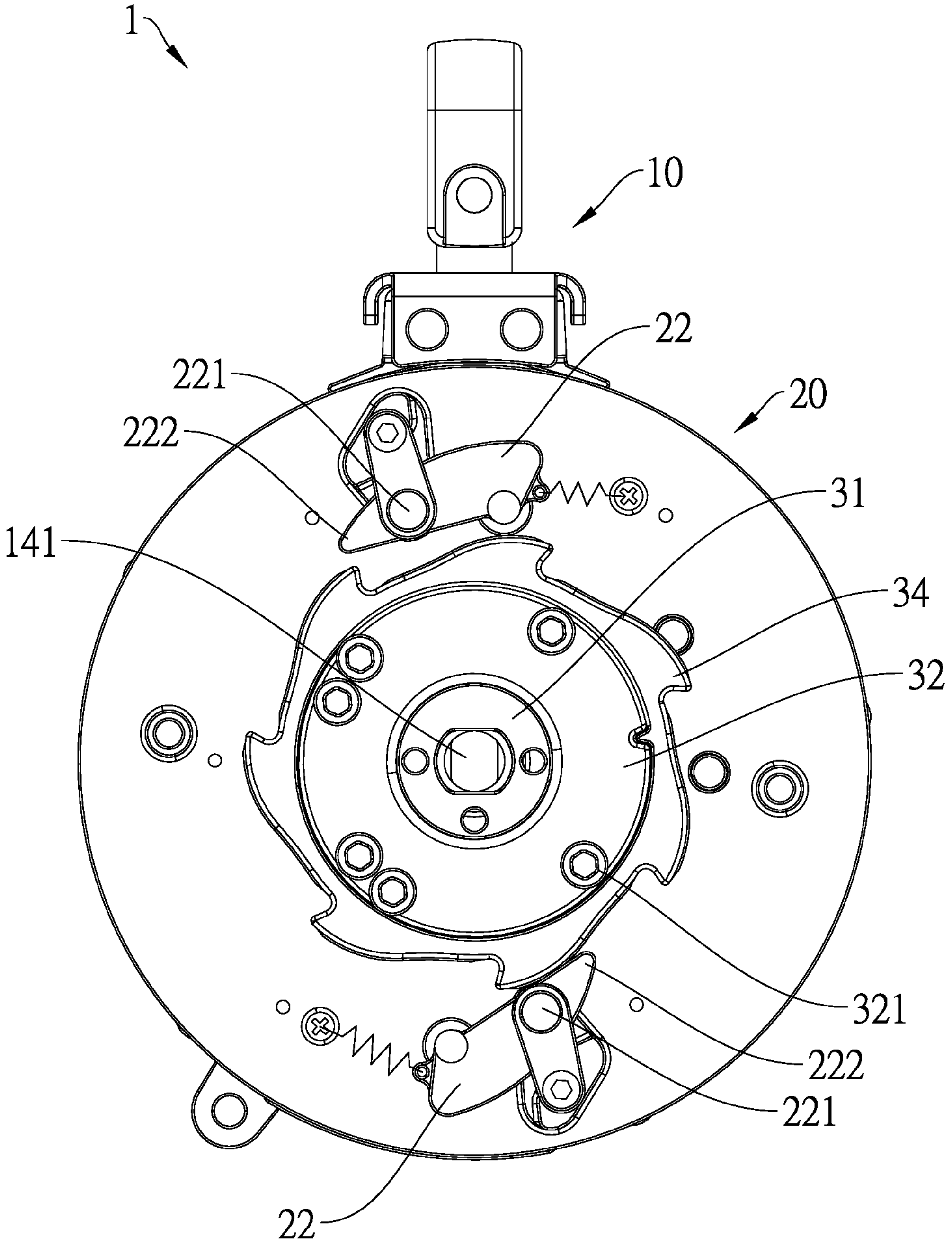
FIG. 3 is a front view of the fall arrester of the first embodiment, wherein the first arm is detached.

As shown in FIG. 1 to FIG. 3, FIG. 1 is a perspective view of a fall arrester 1 of a first embodiment of the present invention; FIG. 2 is a partial exploded view of the fall arrester in FIG. 1; FIG. 3 is a front view of the fall arrester 1, wherein a first arm 12 of a holder 10 is detached. The fall arrester 1 in FIG. 1 to FIG. 3 includes a holder 10, a rotating drum 20, and a braking module 30.

The holder 10 includes the first arm 12 and a second arm 14. The rotating drum 20 is pivotally installed on the holder 10, and is located between the first arm 12 and the second arm 14.

The rotating drum 20 includes a main body 21 and at least one pawl 22, wherein the main body 21 has a setting part 212 and an accommodating part 214 that is provided to be wound by a flexible long strip. Each pawl 22 has a first abutting portion 222 and a pivot shaft 221, and is pivotally installed on the setting part 212 by the pivot shaft 221. When the rotating drum 20 rotates at a rotating speed which is equal to or greater than a predetermined rotating speed, the first abutting portion 222 pivots from a first position to a second position. On the other hand, if the rotating drum 20 rotates at a rotating speed which is less than the predetermined rotating speed, the first abutting portion 222 of the pawl 22 would not always keep abutting against second abutting portions 302 of the braking module 30; at this time, the pawl 22 is in a normally open state.

The braking module 30 has a convex portion 31 and is fixed to the first arm 12 by the convex portion 31 so that the braking module 30 is located between the first arm 12 and the setting part 212 of the rotating drum 20. The braking module 30 further has a plurality of second abutting portions 302 which are located on a rotation path of the first abutting portion 222 in the second position, wherein the rotation path is formed by the rotation of the rotating drum 20. Additionally, the second abutting portions 302 can abut against the first abutting portion 222 to stop the rotation of the rotating drum 20.

Figure 4:
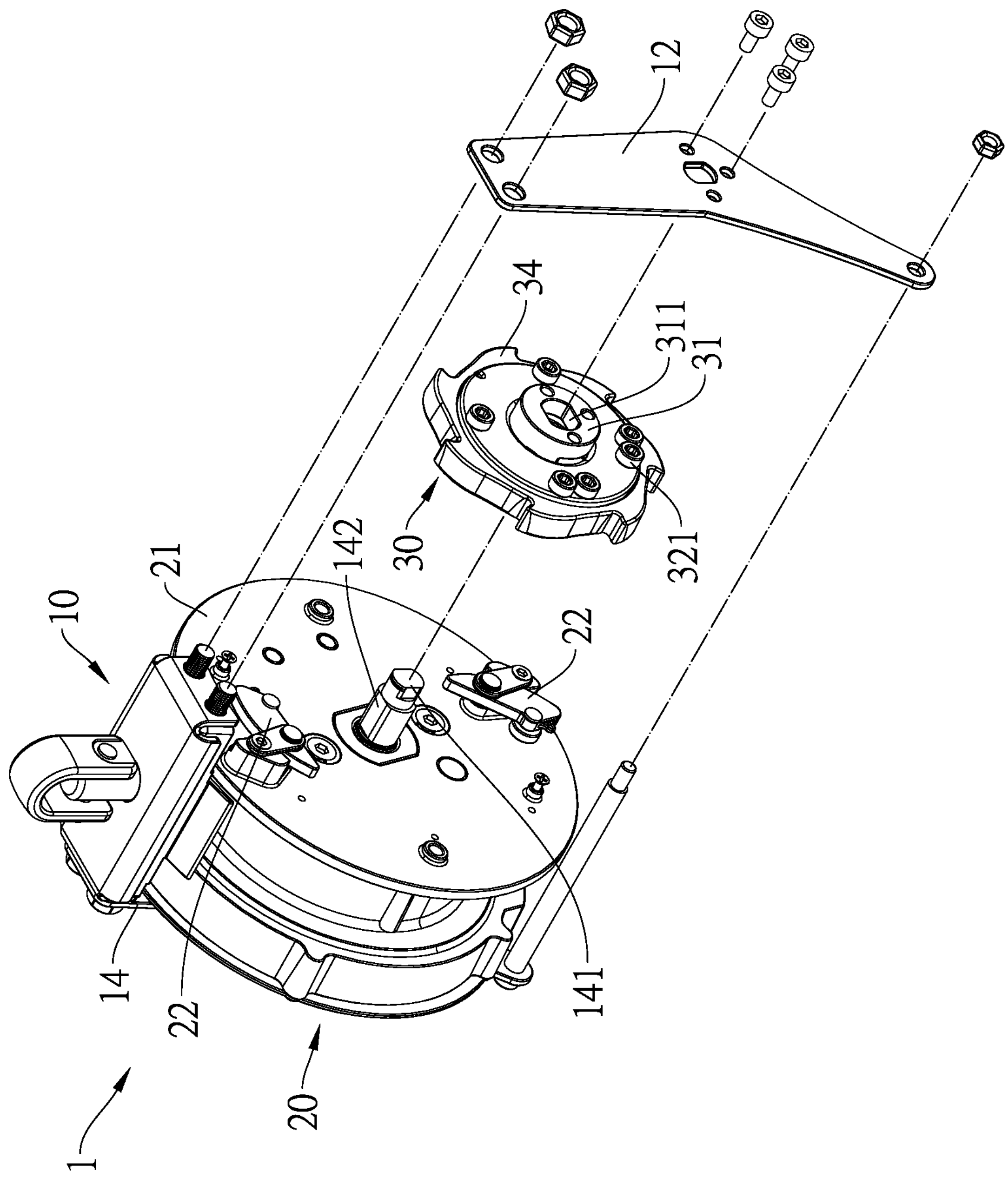
FIG. 4 is a partial exploded view of the fall arrester in FIG. 1.
Figure 5:
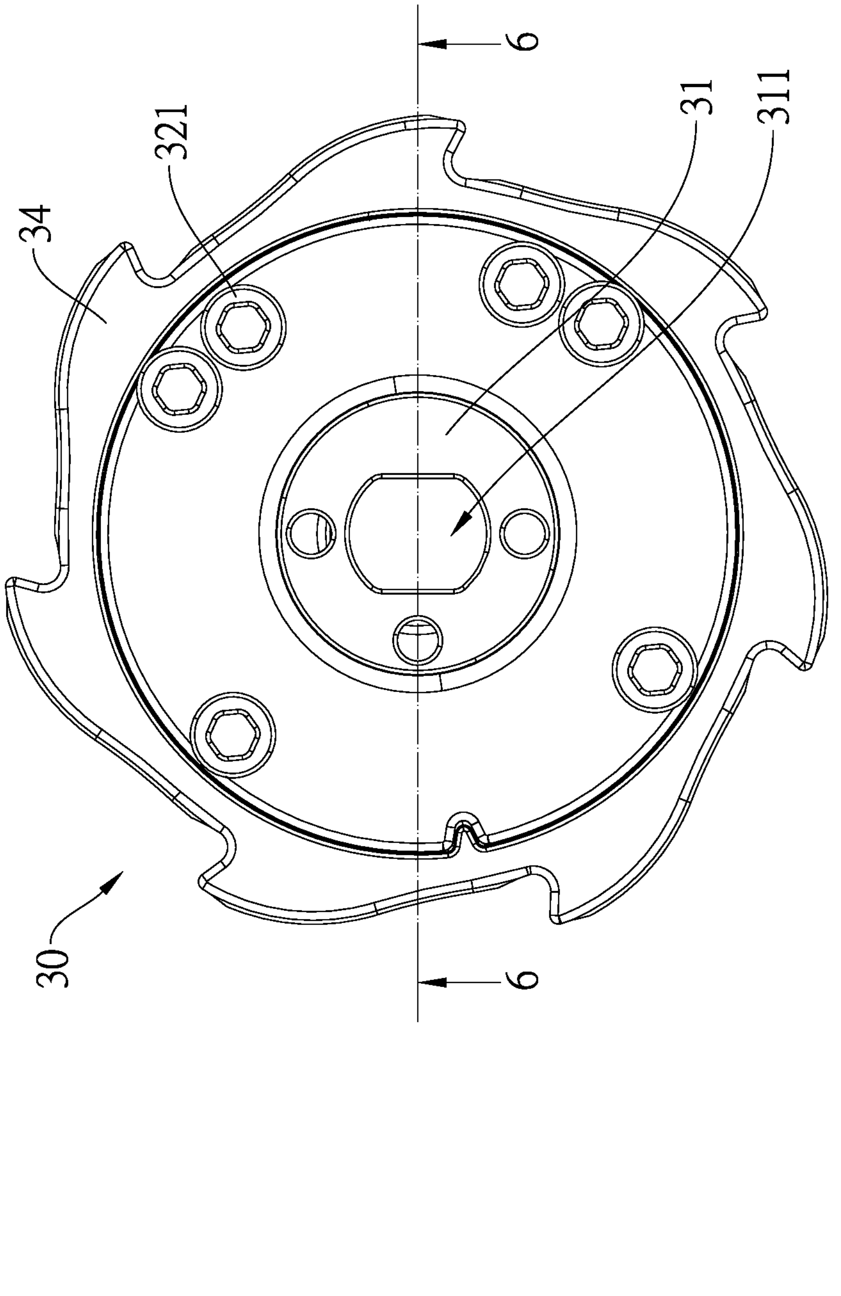
FIG. 5 is a front view of the braking module of the fall arrester of the first embodiment.
Figure 6:
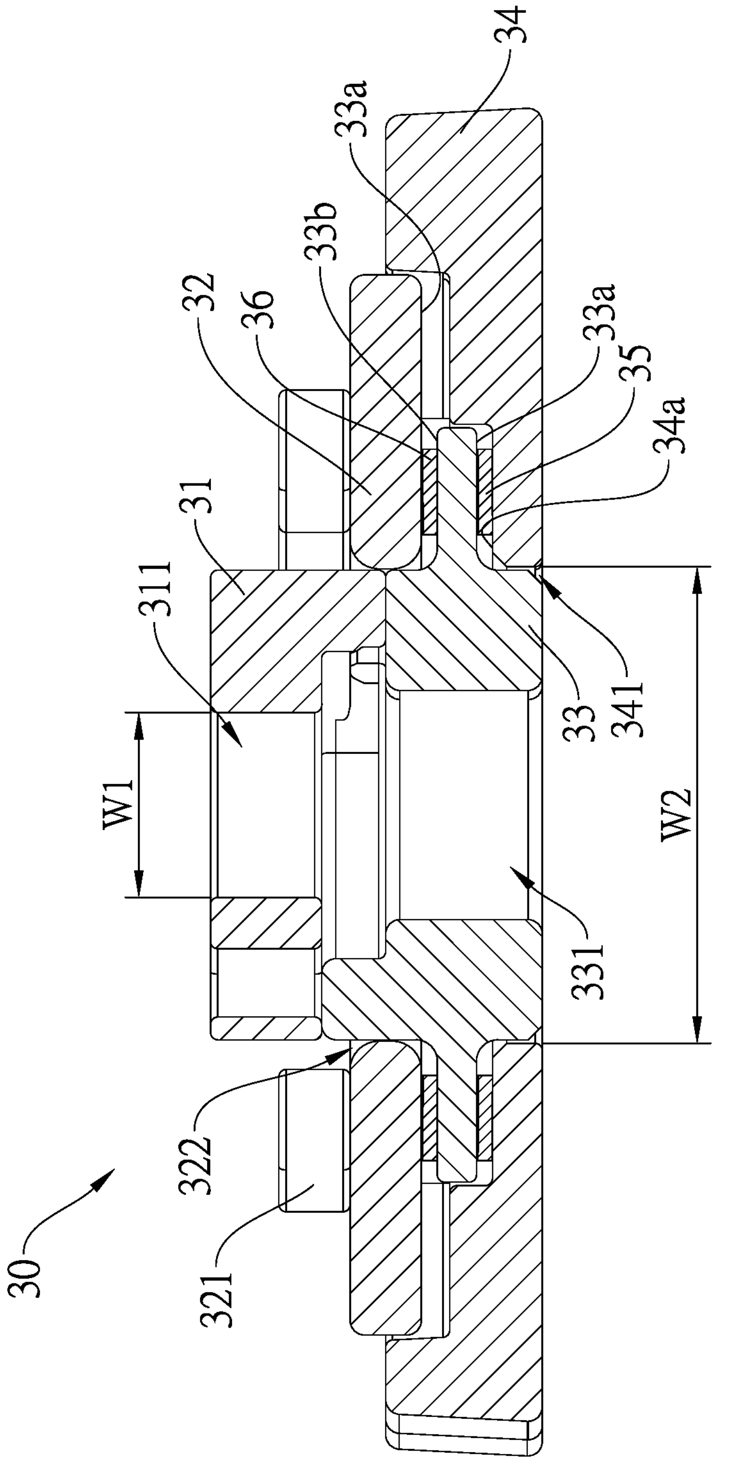
FIG. 6 is a sectional view along the 6-6 line in FIG. 5.
Figure 7:
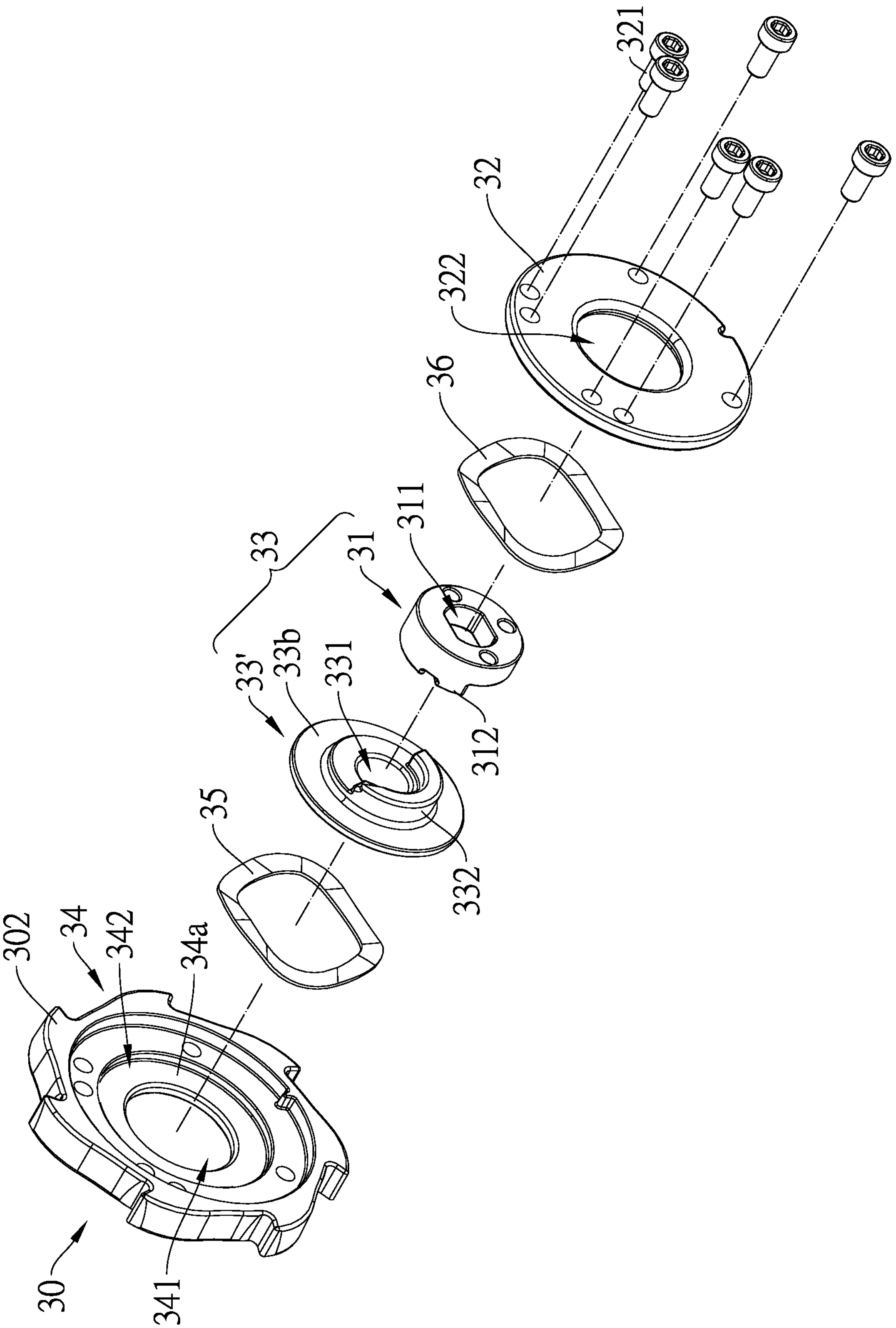
FIG. 7 is an exploded view of the braking module in FIG. 5.

As shown in FIG. 4 to FIG. 7, FIG. 4 is a partial exploded view of FIG. 1; FIG. 5 is a front view of the braking module 30 of the fall arrester 1 of the first embodiment; FIG. 6 is a sectional view along the 6-6 line in FIG. 5; and FIG. 7 is an exploded view of FIG. 5. In FIG. 4, the braking module 30 is an independent component in the fall arrester 1, and can be detached from a shaft pole 141 of the second arm 14 after the first arm 12 of the holder 10 is detached.

As illustrated in FIG. 5 to FIG. 7, the braking module 30 includes a cover 32, a friction plate 33, and a ratchet plate 34, wherein the cover 32, the friction plate 33, and the ratchet plate 34 are coaxially set in order. The ratchet plate 34 has the plurality of second abutting portions 302 on a periphery thereof, and further has an accommodation space 342 for holding the friction plate 33 and the cover 32, wherein the cover 32 and the ratchet plate 34 are fixed to each other and clamp the friction plate 33 therebetween. The friction plate 33 has the convex portion 31 which makes the friction plate 33 be fixed to the first arm 12.

When the rotating drum 20 rotates at a rotating speed greater than or equal to the predetermined rotating speed, which makes the first abutting portion 222 move to the second position and abut against the second abutting portions 302, the cover 32 and the ratchet plate 34 rotate relative to the friction plate 33, which is driven by the rotating drum 20, and moreover, the cover 32 and the ratchet plate 34 generate frictional resistance with the friction plate 33 respectively so as to stop the rotation of the rotating drum 20.

As depicted in FIG. 7, centers of the cover 32 and the ratchet plate 34 have circular holes 322, 341 respectively, and the friction plate 33 has a non-circular hole 311 at the center thereof. The maximum inner diameter W1 of the non-circular hole 311 is less than or equal to the minimum inner diameters of the circular holes 322, 341.

Still referring to FIG. 5-FIG. 7, the friction plate 33 includes a friction part 33' and a non-circular hole part (i.e., convex portion 31). The friction part 33' has a first convex block 332 on an axial direction thereof, wherein the first convex block 332 has a circular hole 331; the non-circular hole part has a second convex block 312 on an axial direction thereof, wherein the second convex block 312 has the non-circular hole 311. The first convex block 332 and the convex portion 31 are respectively located on two opposite sides of the friction part 33'. The first convex block 332 and the second convex block 312 are connected to each other along the axial direction with dislocation.

In the embodiment of the present invention, a side surface of the first convex block 332 is detachably connected to a side surface of the second convex block 312. When the side surface of the first convex block 332 is connected to the side surface of the second convex block 312, the second convex block 312 of the non-circular hole part abuts against and pushes the first convex block 332 of the friction part 33', so that the friction part 33' is unable to rotate relative to the non-circular hole part.

As shown in FIG. 4, the second arm 14 includes the shaft pole 141 passing through the rotating drum 20 and the braking module 30. The shaft pole 141 has a non-cylindrical section 142 matching the non-circular hole 331, so that the friction plate 33 is fixed to the shaft pole 141, and the cover 32 and the ratchet plate 34 can rotate relative to the friction plate 33 and the shaft pole 141.

As shown in FIG. 6, the ratchet plate 34 has a first friction surface 34*a*, and the friction plate 33 has a second friction surface 33*a* and a third friction surface 33*b*, which are opposite to each other; the cover 32 has a fourth friction surface 32*a*. The first friction surface 34*a* faces the second friction surface 33*a*, and the third friction surface 33*b* faces the fourth friction surface 32*a*. In an embodiment of the present invention, the first friction surface 34*a* is in touch with the second friction surface 33*a*, and the third friction surface 33*b* is in touch with the fourth friction surface 32*a*.

In the first embodiment, the braking module 30 includes at least one elastic member 35, 36, which is located between the first friction surface 34*a* and the second friction surface 33*a*, the third friction surface 33*b* and the fourth friction surface 32*a*, or between the combination thereof. As illustrated in FIG. 6 and FIG. 7, the braking module 30 includes two elastic members 35, 36. The elastic member 35 is set between the first friction surface 34*a* and the second friction surface 33*a*, and is in touch with the first friction surface 34*a* and the second friction surface 33*a* respectively. The elastic member 36 is set between the third friction surface 33*b* and the fourth friction surface 32*a*, and is in touch with the third friction surface 33*b* and the fourth friction surface 32*a* respectively. In the first embodiment, the elastic members 35, 36 include wave washers, especially wave washers made of metals.

Furthermore, when the cover 32 of the braking module 30, the elastic member 36, the friction plate 33, the elastic member 35, and the ratchet plate 34 are connected in sequence, and are fixed by a plurality of fixing members 321, the elastic members 35, 36 generate elastic tension on the fixing members 321. At this time, the fixing members 321 can be locked by a torque wrench (not shown) so that the fixing members 321 have a predetermined torque value. When the fall arrester 1 is used for a long time, the braking module 30 will be worn out, which reduces the torque value of the fixing members 321. In this case, if the torque values of the fixing members 321 are lower than the standard value, the braking module 30 must be replaced with a new one immediately to ensure that the braking module 30 of the fall arrester 1 has a consistent predetermined (initial) torque value.

In the first embodiment, the cover 32 and the ratchet plate 34 are fixedly connected to each other by the fixing members 321. The distances between the fixing members 321 and the axis of the braking module 30 are greater than the outer diameter of the friction plate 33 in order to improve the clamping effect of the cover 32 and the ratchet plate 34 on the friction plate 33, and to further improve the braking effect among the cover 32, the friction plate 33, and the ratchet plate 34.

With the above design of the fall arrester, the braking module of the fall arrester can be replaced with a new one by easy dismantling steps. In addition, each new braking module has the same value of braking parameters.

It must be noted that the embodiments described above are only preferred embodiments of the present invention. All equivalent structures which employ the concepts disclosed in this specification and the appended claims should fall within the scope of the present invention.

What is claimed is:

1. A fall arrester, comprising:

a holder which comprises a first arm and a second arm;

a rotating drum which is pivotally provided on the holder and located between the first arm and the second arm; the rotating drum comprises a main body and at least one pawl, wherein the main body has an accommodating part and a setting part; the accommodating part is provided to be wound by a flexible long strip; the at least one pawl has a first abutting portion and is pivotally provided on the setting part; when the rotating drum rotates at a rotating speed which is equal to or greater than a predetermined rotating speed, the first abutting portion of the at least one pawl pivots from a first position to a second position;

a braking module which has a convex portion and is fixed to the first arm by the convex portion so that the braking module is located between the first arm and the setting part; the braking module further has a plurality of second abutting portions which are located on a rotation path of the first abutting portion in the second position, wherein the rotation path is formed by the rotation of the rotating drum; the second abutting portions can abut against the first abutting portion;

wherein the braking module comprises a cover, a friction plate, and a ratchet plate, which are coaxially set in order; the ratchet plate has the plurality of second abutting portions on a periphery thereof, and further has an accommodation space for holding the friction plate and the cover, wherein the cover and the ratchet plate are fixedly connected to each other and clamp the friction plate therebetween; the friction plate has the convex portion which makes the friction plate be fixed to the first arm; when the rotating drum rotates at a rotating speed greater than or equal to the predetermined rotating speed, which makes the first abutting portion move to the second position and abut against the second abutting portions, the cover and the ratchet plate rotate relative to the friction plate, which is driven by the rotating drum, and moreover, the cover and the ratchet plate generate frictional resistance with the friction plate respectively so as to stop the rotation of the rotating drum;

wherein both the cover and the ratchet plate have a circular hole at a center thereof respectively; the friction plate has a non-circular hole at a center thereof, and a maximum inner diameter of the non-circular hole is less than or equal to a minimum inner diameters of the circular holes; the second arm comprises a shaft pole passing through the rotating drum and the braking module; the shaft pole has a non-cylindrical section which matches the non-circular hole, so that the friction plate is fixed to the shaft pole, and the cover and the ratchet plate is rotatable relative to the friction plate;

wherein the friction plate comprises a friction part and a non-circular hole part; the friction part has a first convex block on an axial direction thereof, and the non-circular hole part has a second convex block on an axial direction thereof; the first convex block and the convex portion are respectively located on two opposite sides of the friction part; the first convex block and the second convex block are connected to each other along the axial direction with dislocation.

2. The fall arrester of claim 1, wherein a side surface of the first convex block is detachably connected to a side surface of the second convex block; when the side surface of the first convex block is connected to the side surface of the second convex block, the second convex block of the non-circular hole part abuts against and pushes the first convex block of the friction part, so that the friction part is unable to rotate relative to the non-circular hole part.

3. The fall arrester of claim 1, wherein the ratchet plate has a first friction surface, and the friction plate has a second friction surface and a third friction surface, which are opposite to each other; the cover has a fourth friction surface; the first friction surface and the second friction surface face each other, and the third friction surface and the fourth friction surface face each other.

4. The fall arrester of claim 3, wherein the first friction surface and the second friction surface are in contact with each other, and the third friction surface and the fourth friction surface are in contact with each other.

5. The fall arrester of claim 3, wherein the braking module comprises at least one elastic member which is provided between the first friction surface and the second friction surface, or between the third friction surface and the fourth friction surface, or between a combination thereof.

6. The fall arrester of claim 3, wherein the cover and the ratchet plate are fixedly connected by a plurality of fixing members; distances between the fixing members and an axis of the braking module are greater than an outer diameter of the friction plate.

7. A fall arrester, comprising:

a holder which comprises a first arm and a second arm;

a rotating drum which is pivotally provided on the holder and located between the first arm and the second arm; the rotating drum comprises a main body and at least one pawl, wherein the main body has an accommodating part and a setting part; the accommodating part is provided to be wound by a flexible long strip; the at least one pawl has a first abutting portion and is pivotally provided on the setting part; when the rotating drum rotates at a rotating speed which is equal to or greater than a predetermined rotating speed, the first abutting portion of the at least one pawl pivots from a first position to a second position;

a braking module which has a convex portion and is fixed to the first arm by the convex portion so that the braking module is located between the first arm and the setting part; the braking module further has a plurality of second abutting portions which are located on a rotation path of the first abutting portion in the second position, wherein the rotation path is formed by the rotation of the rotating drum; the second abutting portions can abut against the first abutting portion;

wherein the braking module comprises a cover, a friction plate, and a ratchet plate, which are coaxially set in order; the ratchet plate has the plurality of second abutting portions on a periphery thereof, and further has an accommodation space for holding the friction plate and the cover, wherein the cover and the ratchet plate are fixedly connected to each other and clamp the friction plate therebetween; the friction plate has the convex portion that is directly fixed to the first arm; when the rotating drum rotates at a rotating speed greater than or equal to the predetermined rotating speed, which makes the first abutting portion move to the second position and abut against the second abutting portions, the cover and the ratchet plate rotate relative to the friction plate, which is driven by the rotating drum, and moreover, the cover and the ratchet plate generate frictional resistance with the friction plate respectively so as to stop the rotation of the rotating drum.

* * * * *